United States Patent
Kao et al.

(10) Patent No.: US 8,952,802 B2
(45) Date of Patent: Feb. 10, 2015

(54) EVENT NOTIFICATION METHOD AND PORTABLE APPARATUS WITH EVENT NOTIFICATION FUNCTION

(75) Inventors: Yih-Feng Kao, Taoyuan (TW); Hui-Wen Wang, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 254 days.

(21) Appl. No.: 13/347,690

(22) Filed: Jan. 10, 2012

(65) Prior Publication Data

US 2012/0176236 A1 Jul. 12, 2012

(30) Foreign Application Priority Data

Jan. 12, 2011 (TW) .............................. 100101157 A

(51) Int. Cl.
*G08B 23/00* (2006.01)
(52) U.S. Cl.
USPC ................ 340/502; 340/309.7; 340/539.11; 455/412.1; 455/412.2; 455/567
(58) Field of Classification Search
USPC ................ 340/502, 309.7, 309.16, 539.11; 455/412.2, 412.1, 466, 567, 415; 379/207.03
See application file for complete search history.

(56) References Cited

U.S. PATENT DOCUMENTS

| | | | |
|---|---|---|---|
| 6,728,349 B2 * | 4/2004 | Chang et al. ............... | 379/93.23 |
| 7,366,548 B2 * | 4/2008 | Del Signore ................. | 455/567 |
| 2001/0029194 A1 * | 10/2001 | Ketola et al. ................ | 455/567 |
| 2004/0119600 A1 | 6/2004 | Hampton | |
| 2004/0142662 A1 | 7/2004 | Ehrenberg | |
| 2006/0223547 A1 | 10/2006 | Chin et al. | |
| 2007/0015503 A1 | 1/2007 | Choi | |

FOREIGN PATENT DOCUMENTS

| | | |
|---|---|---|
| CN | 101739792 A | 6/2010 |
| EP | 1885109 A2 | 2/2008 |
| FR | 2938098 A1 | 5/2010 |
| TW | 201018185 A | 5/2010 |

OTHER PUBLICATIONS

Office action issued by Taiwan Intellectual Property Office on Apr. 13, 2012.
Office action issued by State Intellectual Property Office of the People's Republic of China on Jan. 19, 2011.

* cited by examiner

*Primary Examiner* — Toan N Pham
(74) *Attorney, Agent, or Firm* — Rabin & Berdo, P.C.

(57) ABSTRACT

An event notification method and a portable apparatus with event notification function are provided. The method comprises the following steps: A notification event is detected. Whether the notification event is read after no operation is applied to an electronic device for a first time interval is determined. If not, whether the electronic device changes to a second moving state from a first moving state and maintains the second moving state for a second time interval is determined. If so, a notification signal indicating the occurrence of the notification event is outputted.

20 Claims, 3 Drawing Sheets

EVENT NOTIFICATION METHOD AND PORTABLE APPARATUS WITH EVENT NOTIFICATION FUNCTION

This application claims the benefit of Taiwan application Serial No. 100101157, filed Jan. 12, 2011, the subject matter of which is incorporated herein by reference.

BACKGROUND

1. Technical Field

The disclosure relates in general to an event notification method and an electronic apparatus, and more particularly to a method for providing event notification according to the moving state and a portable apparatus using the same.

2. Description of the Related Art

Portable devices such as a mobile phone, a multimedia player, a personal digital assistant (PDA), and a digital camera, have become indispensable belongings to the users due to the convenience of use for daily life. Most of the portable devices provide notification function. A notification signal will be generated, for example, when there are missed calls or unread text messages or e-mails, or by a time management program that provides calendar, to-do event, anniversaries, or other notification functions, or when the device needs to interact with the user or inform the user of the status of the device.

Conventional notification function shows the notification on the screen when the portable device outputs a notification signal. For example, when the mobile phone receives a text message or an e-mail, a notification signal is immediately outputted to inform the user to read the received text or mail. If the user still has not read the received text or mail, the user will be notified every period of time.

In an age of rampant information, a user will receive plenty of information or event notification from a portable device such as a mobile phone or a portable computer. When the user is busy dealing with daily routines such as driving, meeting, conversation, or sports, the user may not want to deal with such unexpected notification signal. According to a conventional approach, whether the user is at the vicinity of the mobile phone is detected first before a notification is outputted. According to another conventional approach, a notification is outputted as soon as it is detected that the user switches to another moving state. However, if the user simply does not want to deal with or read the notification signal for the time being and is operating other functions of the mobile phone, the above method will keep generating many notification signals, causing inconvenience to the user and ending up with unpleasant experience with the portable device.

Thus, the conventional notification function still needs to be further improved.

SUMMARY

The disclosure is directed to a portable device with event notification function and an event notification method thereof. The timing for outputting a notification signal is determined in response to the variability in human behavior and avoids disturbance to the user, so that the user is notified under suitable circumstances. Thus, the man-machine interaction can be further improved, so that the user can enjoy pleasant experience with the electronic device.

The disclosure provides an embodiment of an event notification method used in an electronic device. The method comprises the following steps: A notification event is detected. Whether the notification event is read after no operation is applied to an electronic device for a first time interval is determined. If not, whether the electronic device changes to a second moving state from a first moving state and maintains the second moving state for a second time interval is determined. If so, a notification signal indicating the occurrence of the notification event is outputted.

The disclosure further provides an embodiment of a storage medium, which is loaded to an electronic device for executing the aforementioned event notification method. Moreover, such storage medium can be viewed as covering a storage medium including computer readable information, and stores at least one program or software module, which can be viewed as a form of presentation of the storage medium. The program can be used for executing the embodiment of the above event notification method.

The disclosure further provides an embodiment of a portable apparatus with event notification function. The device comprises: a sensing unit and a processing unit. The sensing unit generates a sensing signal. The processing unit detects a notification event and determines whether the notification event is read after no operation is applied to an electronic device for a first time interval. If the notification event is not read after no operation is applied to the electronic device for the first time interval, then the processing unit, according to the sensing signal, determines whether the electronic device changes to a second moving state from a first moving state and maintains the second moving state for a second time interval. If the second moving state is maintained for the second time interval, then the processing unit outputs a notification signal to indicate the occurrence of the notification event.

The above and other aspects of the disclosure will become better understood with regard to the following detailed description of the non-limiting embodiment(s). The following description is made with reference to the accompanying drawings.

DETAILED DESCRIPTION

Figure 1:
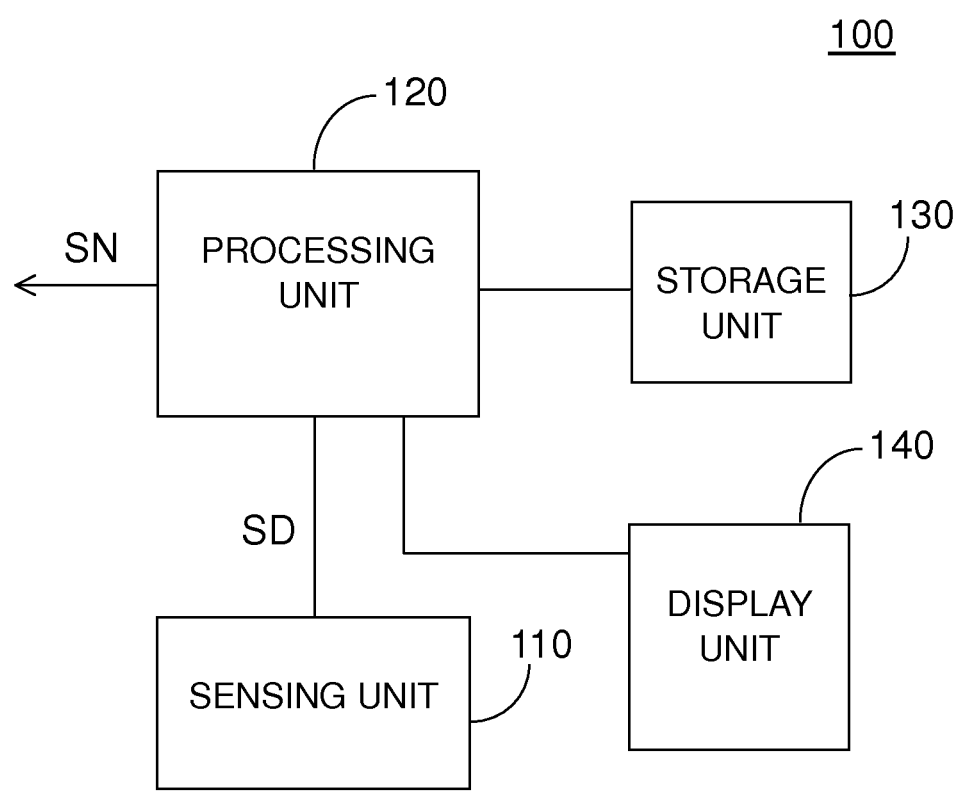
FIG. 1 shows a block diagram of an embodiment of a portable device.

FIG. 1 shows a block diagram of an embodiment of a portable device. The portable device 100 has an event notification function capable of outputting a notification signal to inform the user of the occurrence of a notification event. The timing for outputting the notification signal considers the variability in human behavior and avoids disturbance to the user, so that the user is informed appropriately. The notification event is an event generated by the portable device 100, a system, or an application program thereof or an external event, for example a missed call, an unread text message, or an e-mail. The calendar, to-do task, anniversary and the like provided by the time management program or service executed by the portable device 100 can also generate a notification event. A notification event is also generated when the portable device 100 needs to interact with the user or inform the user of the state of the device. It should be noted that, the definition of the notification event is not limited to those exemplified above.

In FIG. 1, the portable device 100 illustrates a portion of a different types of devices, for example a mobile phone, a smart phone, a tablet PC, a car PC, a multimedia player, a PDA, a game player, or a digital camera. In practical application, the portable device may be implemented according to the requirements of the device to be realized with other architectures or elements based on the present embodiment to provide event notification function. However, the portable device is not limited to the exemplification illustrated in the drawing.

The portable device 100, or referred to as the electronic device, for example, comprises a sensing unit 110 and a processing unit 120. The sensing unit 110 generates a sensing signal SD. The sensing unit 110, for example, comprises at least one sensor, which senses the variation in the physical quantities to generate the sensing signal SD as the position, environment, or movement of the electronic device varies. Examples of the sensor comprise acceleration sensor, G-sensor, angular velocity sensor, gyro-sensor, compass sensor, and image sensor. Thus, the sensing signal SD can be viewed as a signal indicating one or more physical quantities corresponding to the moving state of the electronic device. For example, the sensing signal may indicate the acceleration, angular velocity, or azimuth in at least one or multiple directions, or at least one image signal, or a combination of the above physical quantities. The processing unit 120 detects a notification event, and determines whether the event is read after no operation is applied to the electronic device 100 for a first time interval T1 (e.g., 10 seconds or 1 or 5 minutes). If the event is not read, then the processing unit 120 determines whether the electronic device 100 changes to a second moving state from a first moving state and maintains the second moving state for a second time interval T2 (e.g., 10 seconds or 1, 3, or 5 minutes). If the second moving state is maintained for the second time interval T2, then the processing unit 120 outputs a notification signal SN to indicate the occurrence of the notification event.

For example, the processing unit 120, according to the sensing signal SD, determines that the electronic device 100 is in one moving state among a plurality of moving states. The one moving state is a type of variation in the characteristics of the sensing signal SD of the sensing unit 110. Since the actions or movements, for example remaining still, walking, driving and so on, engaged by the user carrying the electronic device 100 have corresponding types of variation in the characteristics of the sensing signal SD, it can be determined that the electronic device 100 is in one moving state among a plurality of moving states accordingly.

When the processing unit 120, according to the variation in the sensing signal SD, determines that the electronic device 100 changes to a second moving state (e.g., remaining still) of a plurality of moving states from a first moving state (e.g., walking) of the moving states and maintains the second moving state for a second time interval T2 (e.g., 10 seconds or 1, 3, or 5 minutes), then the processing unit 120 outputs a notification signal SN to indicate the occurrence of the above event. The notification signal SN may be realized by different ways such as vibration, sound, light, displayed message, or a combination thereof.

As for the user, the timing for the portable device 100 outputs the notification signal is determined in response to variability in human behavior and avoids disturbance to the user. An embodiment of the event notification method is further disclosed below for elaborating various implementations in which the portable device 100 of FIG. 1 appropriately outputs the notification signal.

Figure 2:
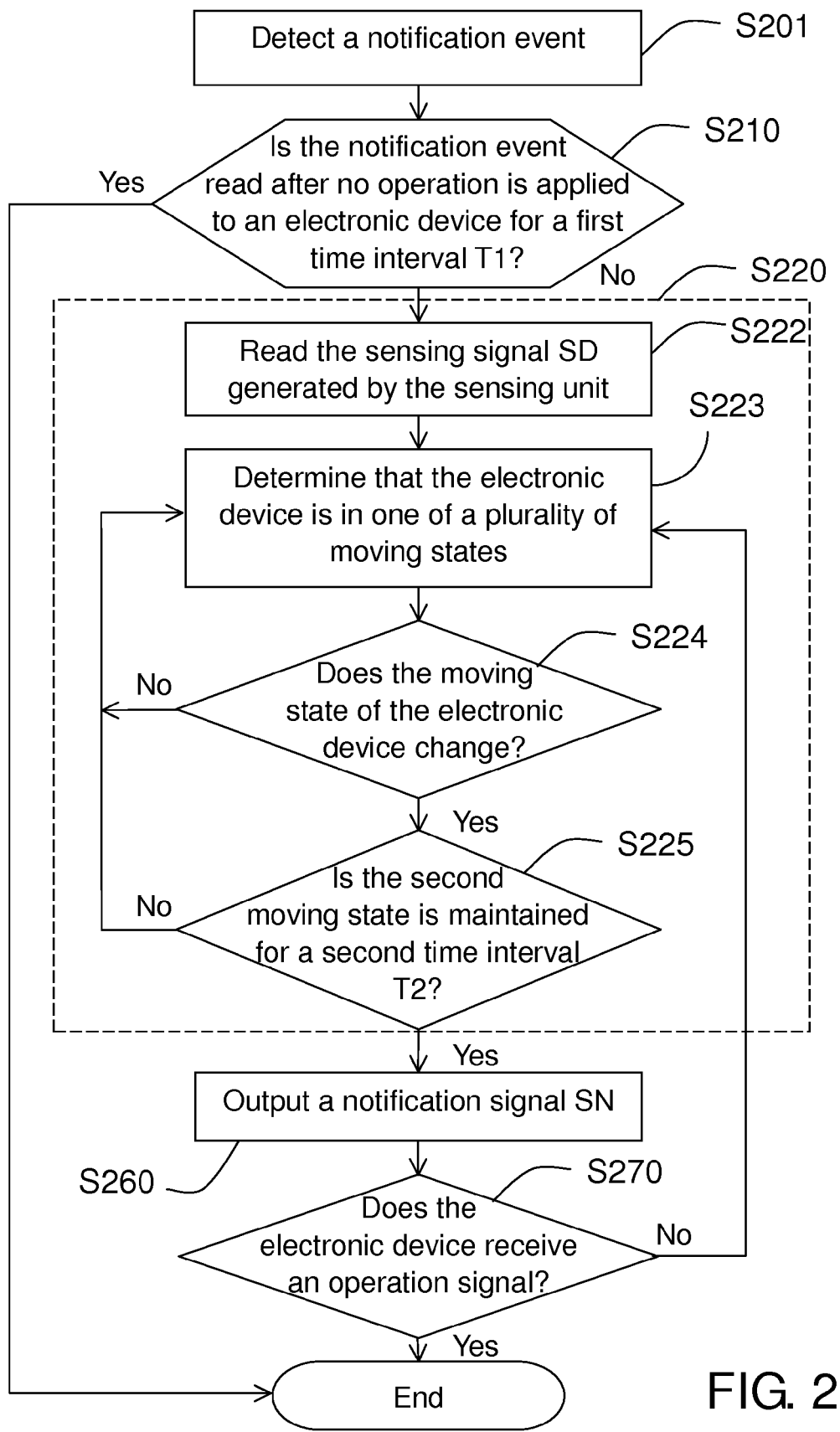
FIG. 2 shows a flowchart of an embodiment of an event notification method.

FIG. 2 shows a flowchart of an embodiment of an event notification method. The method is applicable to the portable device 100 indicated in FIG. 1. Block S201 indicates the occurrence of a notification event. Step S210 indicates the processing unit 120 determines whether the notification event is read after no operation is applied to the electronic device 100 for a first time interval T1. If not, it is determined whether the electronic device 100 changes to a second moving state from a first moving state and maintains the second moving state for a second time interval T2, as indicated in step S220. If the electronic device 100 changes to the second moving state from the first moving state and maintains the second moving state for the second time interval T2, then a notification signal SN indicating the occurrence of the notification event is outputted, as indicated in step S260.

The implementation of step S220 is disclosed below. Step S220 may be implemented by, for example, steps S222 to S225, in which suitable timing is determined for informing the user of the occurrence of a notification event is obtained and the notification signal.

If it is determined in step S210 that the notification event is read, the processing unit 120 may be implemented to terminate the method. However, the present embodiment is not limited there to, and the processing unit 120 may be implemented to execute other actions such as detection or notification. In addition, after the first time interval T1, the electronic device 100 of the present embodiment is still in a normal operation mode, but the invention is not limited to such exemplification. For example, in some embodiments, the electronic device 100, after the first time interval T1, enters a power saving mode, such as a screen shutdown mode, a standby mode, or a sleep mode. After the electronic device 100 enters a power saving mode, the electronic device 100 may continue executing step S220 to obtain suitable timing for informing the user of the occurrence of the notification event.

The above step S210 is substantially helpful in obtaining suitable timing for informing the user of the occurrence of the event. When a notification event occurs, the user may still be using the portable device 100 for reading an e-book, watching a film, or playing a game, for example. Meanwhile, the user may have noticed the notification event but simply reluctant to deal with the notification event right away. Thus, in an embodiment of the method, step S220 is executed only when it is determined that the notification event is not read after no operation is applied to the electronic device 100 for the first time interval T1 (e.g., 10 seconds or 1 or 5 minutes). Otherwise, if step 220 is executed when the user is still operating the electronic device 100, many notification signals will likely be generated, causing inconvenience and distraction to the user, and ending with unpleasant experience of use.

In addition, the above step S220 is substantially helpful in obtaining suitable timing for informing the user of the occurrence of the event. In step S220, it is determined whether the electronic device 100 changes to a second moving state from a first moving state and maintains the second moving state for a second time interval T2 (e.g., 10 seconds or 1, 3, or 5 minutes). This design considers the variability in human behavior. That is, in a behavior state such as standing, sitting, or remaining still, a person may still have some minor movements. For example, when a person is walking, he/she may wave hand to greet his/her friends or look around. These temporary movements may temporarily change the moving state of the electronic device 100; however, at that time the user does not really change to another behavior state. In step S220, the determination based on whether the electronic device 100 changes to the second moving state and maintains the second moving state for a second time interval T2 compensates for the difference between the moving state of the electronic device 100 (or the sensing unit 110) and the behavior state of a person (that is, the user) and enables the electronic device 100 to take the characteristics of human behavior into consideration so as to make a reasonable determination considerate of the user's behavior characteristics. Thus, the electronic device 100 obtains suitable timing for informing the user of the occurrence of the event and will not frequently output notification signals, which may make the user feel bothered or distracted. The method also avoids the situation that the notification signal is left unattended when the user does not really change his/her behavior state.

The implementation of step S220 is disclosed below. Step S220 can be implemented by such as steps S222 to S225, in which suitable timing for informing the user of the occurrence of a notification event is obtained and the notification signal is outputted.

As indicated in step S222, the processing unit 120 reads or receives the sensing signal SD generated by the sensing unit 110 of the electronic device 100. Moreover, step S222 may also be implemented in the manner that the processing unit 120 will not enable the sensing unit 110 until the present step. After the sensing unit 110 is enabled, the sensing unit 110 will sense the variation in at least one physical quantity as the position, movement, or environment of the electronic device 100, and generate a sensing signal SD which is read or received by the processing unit 120. However, the timing for enabling the sensing unit 110 is not limited to the above exemplification, and other suitable timing may also be designed.

As indicated in step S223, it is determined, according to the sensing signal, that the electronic device 100 is in one moving state among a plurality of moving states such as the moving states corresponding to the aforementioned human behaviors such as remaining still, walking, jogging, driving, sitting in a car, or other moving states. As indicated in step S224, whether the moving state of the electronic device 100 changes (that is, changes to a second moving state from a first moving state of a plurality of moving states) is determined according to the variation in the sensing signal.

As indicated in step S224, whether the electronic device 100 changes a first moving state (that is, the present moving state) of a plurality of moving states is determined according to the variation in the sensing signal. If it is determined that the electronic device 100 changes to a second moving state (that is, a new moving state) of the moving states from the first moving state, then it is further determined whether the second moving state is maintained for a second time interval T2, as indicated in step S225. If the determination is negative in step S224 or S225, then the method returns to step S223, whether the electronic device 100 is in which moving state is determined again.

If it is determined that the second moving state is maintained for a second time interval T2, then a notification signal SN indicating the occurrence of an event is outputted as indicated in step S260. Thus, when the user's behavior state changes (for example, the current event or action is over and the next event or action will be taken soon), providing the notification to the user before the next event starts is easier to catch the user's attention and is better than making the user feel bothered in the course of an event. As disclosed above, the present step further considers the variability in human behavior, and compensates for the difference between the moving state of the electronic device 100 (or the sensing unit 110) and the behavior state of a person (that is, the user) and enables the electronic device 100 to take the characteristics of human behavior into consideration so as to make a reasonable determination considerate of the user's behavior characteristics. Thus, the user can obtain satisfactory experience of using the electronic device 100.

The implementation of step S220 is not limited to the aforementioned steps S222 to S225. In implementation, various combinations of the determinations for defining the moving states and other embodiments of the disclosure may be made. In short, any implementations capable of determining whether the electronic device 100 changes to a second moving state from a first moving state and maintains the second moving state for a second time interval T2 are within the scope of embodiments of the disclosure.

In addition, an embodiment of step S223, in which whether the electronic device 100 is in one moving state among a plurality of moving states is determined, may comprise: detecting the variation in the characteristics of the sensing signal over a third time interval T3 to determine whether the electronic device 100 is in one moving sate among a plurality of moving states, wherein the second time interval is greater than the third time interval.

The above embodiment of step S223 avoids the change of the moving state being erroneously determined due to the instant interference caused by the noises of the sensing unit 110 or external noises. A block MS shown in FIG. 3 indicates that currently the user is in a moving state, for example, remaining still. Once the sensing signal changes instantly (for example, the noises denoted by block NE is generated), the characteristics of the sensing signal may vary. According to the embodiment of step S223, since the occurrence of noises denoted by the block NE is smaller than the third time interval T3 (such as 1, 2, or 3 seconds) or the average value or variance of the noises over the third time interval T3 is lower than a threshold value, the processing unit 120 does not regard the variation in the sensing signal of the block NE as a change in the moving state of the electronic device 100. Therefore, the noises can be filtered.

Figure 3:
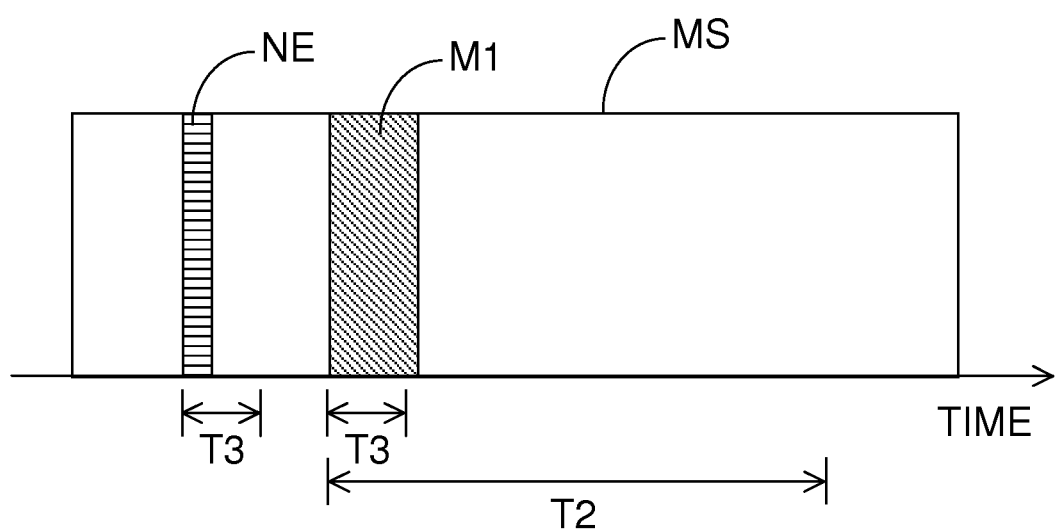
FIG. 3 shows a schematic diagram of the determination made in an embodiment of an event notification method when a moving state is interfered with noises and human behavior changes.

As indicated in FIG. 3, in another period of the remaining still state denoted by the block M1, the user may have some minor movements such as looking around or moving his/her body for a while (such as 5 seconds), the characteristics of the sensing signal may vary accordingly. According to step S223, the moving state of the electronic device 100 may be regarded as changing to a second moving state from the first moving state (such as the remaining still state). However, the user's behavior state does not change in reality and still maintains the remaining still state. To compensate for the difference between the determination made in step S223 and the user's actual behavior state, whether the second moving state is maintained for a second time interval T2 (e.g., 10 seconds to 3 minutes) is further determined in step S224. As indicated in FIG. 3, the block M1 indicating the duration of variation in the sensing signal is smaller than the second time interval T2. As indicated in step S225, the embodiment of the method returns to step S223 without outputting a notification signal.

Moreover, the above embodiment of the method may further include step S270 to determine whether the electronic device 100 receives an operation signal. The operation signal may indicate a signal of a press key signal or a signal of a user interface operation, or denotes that the notification event is read. If the electronic device 100 does not receive an operation signal, then the method proceeds to step S220 to obtain a suitable timing for outputting a notification signal. Apart from using whether the notification event is read as a condition to stop executing step S220 with respect to the notification event, the step S270 may further use other conditions which consider the user's other possible reactions after step S260.

Suppose when the user operates the electronic device 100, he/she will immediately notice the notification signal but may not immediately read the notification event. For example, the user may happen to be on the line with the electronic device 100 or doing some other priority jobs. Thus, the user presses a key of the electronic device 100 or operates a user interface such as a touch screen may also be regarded as being conformed to the relevant conditions of the operation signal of step S270. Further, in other embodiments, the electronic device 100 enters a power saving mode after the first time interval T1. Thus, after step S260 is executed, the user may enable the electronic device 100 to resume normal operation from the power saving mode or enable the screen by way of pressing the key, touching the screen or other methods, and these actions may also be regarded as being conformed to the relevant conditions of the operation signal of step S270. Thus, through above embodiments of step S270, the electronic device 100 will not frequently output a notification signal, so that the user will not feel bothered or distracted by the notification signal.

In other embodiments, in step S220, the length of the second time interval T2 may vary with the situation of the second moving state. For example, a correspondence relationship is established between the second time interval T2 and the second moving state. For example, in step S220, the second time interval T2 may be set as 5 seconds when the electronic device 100 changes to a moving state indicating remaining still from a moving state denoting jogging, and the second time interval T2 may be set as 10 seconds when the electronic device 100 changes to a moving state denoting jogging from a moving state denoting remaining still. Thus, appropriate determination can be made in response to the change in the moving state. In another embodiment, the second time interval T2 may be set as a fixed length or may vary with the change in the moving state.

In addition, the sensing unit 110 of the portable device 100 comprises an acceleration sensor or a G-sensor for sensing the variation in acceleration so as to obtain the variation in the position of the portable device. In another embodiment, the sensing unit 110 comprises an angular velocity sensor or a gyro-sensor for sensing the variation in angular velocity so as to obtain the variation in the position of the portable device. The above sensor can also be realized by a global positioning system (GPS) sensor or other positioning system sensor. Thus, the sensing signal, for example, comprises at least one position signal indicating the variation in position, wherein the position signal may be a one-dimensional, two-dimensional, or three-dimensional signal, which denotes the position of each axis of a coordinate system, or physical quantities related to movements such as the acceleration, angular velocity or displacement in the X, Y, Z axis of a two-dimensional or three-dimensional coordinate system.

In another embodiment, the sensing unit 110 may further incorporate other environmental sensor, such as the light sensor, or the image sensor to sense the variation in the environment for the processing unit 120 so as to estimate the user's various moving states according to the variation in position as well as environmental light or image, wherein the sensing signal may further comprise a light signal or an image signal. Likewise, in other embodiments, various environmental sensors such as light sensor, temperature sensor, or pressure sensor may be incorporated in the sensing unit 110 individually or in conjunction with the sensor for sensing the variation in position to generate a sensing signal if these sensors are conducive to the estimation of the user's moving states.

The aforementioned sensing signal which denotes at least one physical quantity or a combination of several physical quantities can be used as a basis for determining the moving state of an electronic device. The moving state of a portable device may vary with the user's behavior state. For example, the portable device may vary significantly such as the variation in acceleration or angular velocity as the user changes to walk or drive to another location from the remaining still state. In addition, the acceleration, angular velocity, or brightness or image obtained by the portable device may vary significantly as the user walks from indoors to outdoors or picks up the portable device from the pocket or the desk.

In the above embodiments, the definition of the moving state of the portable device corresponds to the variation characteristics of the sensing signal. For example, the sensing signal has various wave patterns corresponding to the user's various moving states such as remaining still, walking, or sitting in a car, so that various moving states can be defined accordingly. In practical application, the variation characteristics and conditions of various moving states may be stored in the electronic device 100 and used as a basis for determining the moving states. In some embodiments, the variation, variance, average value, zero-crossing point, amplitude of the sensing signal, variation within a time interval or other parameters that are useful in probability, statistics or signal processing can all be used as characteristic parameters for describing the variation characteristics of the sensing signal corresponding to the user's moving states. For example, the variance of the variation in the characteristics of the sensing signal corresponding to the remaining still state within a time interval approaches to zero. Thus, the variation characteristics of the sensing signal corresponding to a particular behavior state of the user can be used as a determination condition in step S220 (such as step S223 or S224). The variation characteristics of the sensing signal corresponding to other moving states of the user can be defined or obtained by the similar approach, and the similarities are not repeated here for the sake of brevity.

The processing unit 120, which controls the sensing unit 110 to read the sensing signal, may be implemented by an integrated circuit such as micro-controller, micro-processor, digital signal processor, application specific integrated circuit (ASIC), field programmable gate array (FPGA) or logic circuit. In other implementations of the processing unit 120, a storage unit 130 may further be added to record the sensing signal or moving state processed by the processing unit 120. However, the storage unit may also be built in the processing unit 120.

The block diagram of FIG. 1 is a fundamental architecture of the portable device 10. Based on the said architecture, the portable device 100 may be implemented as various portable electronic devices such as mobile phone, smart phone, tablet PC, multimedia player, PDA, digital camera, and game player, or other embedded systems such as GPS device and car PC. The various implementations of the portable device 100 may further comprise other elements to notify the user. Let mobile phone or multimedia player be taken for example. In response to the notification signal outputted by the processing unit 120 after the moving state changes, the function of a mobile phone, e.g., the function of the display unit 140, speaker, keyboard backlight vibrator or a combination thereof, may be triggered to generate a physical signal that the user can feel, e.g., music, voice, sound, flash light, image, or vibration, or a combination thereof. Thus, with respect to the implementation of the portable device 100 in other examples, anyone who is skilled in the technology can design the desired physical signal according to the notification signal generated by the processing unit 120 after the user's moving state changes.

Moreover, the disclosure further discloses an embodiment of a storage medium which stores a computer programming code such as composed of several program segments. The storage medium may be implemented as an application program or exist in a system program. After the storage medium is loaded to an electronic device with buffer memory, the electronic device executes several program instructions which are used for executing the event notification method disclosed in the above embodiments. Besides, such storage medium may be viewed as a storage medium containing computer readable information, and stores at least one program or software module, which is viewed as a presentation of the storage medium. The program may be used for executing the above event notification method. The computer readable information storage medium of the present embodiment may be realized by but not limited to optical information storage medium, magnetic information storage medium, or firmware, and may include the program code that can be transmitted via the network or transmission medium (such as air).

According to the portable device with event notification function and the event notification method thereof and the storage medium disclosed in the above embodiment, the timing for outputting a notification signal is determined in response to the variability in human behavior and avoids disturbance to the user, so that the user is notified under suitable circumstances. Thus, the portable device provides more user-friendly notification functions, avoids the user being bothered by unexpected or repeated notification, and further improves man-machine interaction, so that the user can obtain better experience with the electronic device 100.

While the disclosure has been described by way of example and in terms of the exemplary embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An event notification method for use in an electronic device, the method comprising:
   detecting a notification event;
   determining whether the notification event is read after no operation is applied to the electronic device for a first time interval;
   if the notification event is not read after no operation is applied to the electronic device for the first time interval, determining whether the electronic device changes to a second moving state from a first moving state and maintains the second moving state for a second time interval; and
   if the electronic device changes to the second moving state from the first moving state and maintains the second moving state for the second time interval, outputting a notification signal to indicate a occurrence of the notification event.

2. The event notification method according to claim 1, wherein the step of determining whether the electronic device changes to a second moving state from a first moving state and maintains the second moving state for a second time interval comprises:
   determining the electronic device is in one moving state among a plurality of moving states according to a sensing signal generated by a sensing unit; and
   determining whether the electronic device maintains the second moving state for the second time interval when it is determined, according to a variation in the sensing signal, that the electronic device changes to the second moving state from the first moving state, wherein the first moving state is one moving state of the moving states and the second moving state is another moving state of the moving states.

3. The event notification method according to claim 2, wherein the step of determining whether the electronic device is in one moving state among a plurality of moving states comprises: detecting variation characteristics of the sensing signal over a third time interval to determine whether a user of the electronic device is in one of the moving states, and the second time interval is greater than the third time interval.

4. The event notification method according to claim 2, wherein the method further comprises: if the notification event is not read after no operation is applied to the electronic device for the first time interval, enabling the sensing unit of the electronic device to generate the sensing signal.

5. The event notification method according to claim 1, wherein the method further comprises:
   determining whether the electronic device receives an operation signal after the notification signal is outputted; and
   if the electronic device does not receive any operation signal, continuing to execute the step of determining whether the electronic device changes to the second moving state from the first moving state and maintains the second moving state for the second time interval.

6. The event notification method according to claim 5, wherein if the electronic device receives the operation signal, then the method, with respect to the notification event, stops executing the step of determining whether the electronic device changes to the second moving state from the first moving state and maintains the second moving state for the second time interval, the operation signal indicates a signal of a press key or a signal of a user interface operation, or indicates that the notification event is read.

7. The event notification method according to claim 1, wherein length of the second time interval corresponds to the second moving state.

8. The event notification method according to claim 1, wherein the electronic device enters a power saving mode after the first time interval.

9. A recording medium for storing computer programming code for use in an electronic device for providing event notification, wherein the computer programming code enables the electronic device to execute the steps of:
   detecting a notification event;
   determining whether the notification event is read after no operation is applied to the electronic device for a first time interval;
   if the notification event is not read after no operation is applied to the electronic device for the first time interval, determining whether the electronic device changes to a second moving state from a first moving state and maintains the second moving state for a second time interval; and
   if the electronic device changes to the second moving state from the first moving state and maintains the second moving state for the second time interval, outputting a notification signal to indicate the occurrence of the notification event.

10. The recording medium according to claim 9, wherein the step of determining whether the electronic device changes to the second moving state from the first moving state and maintains the second moving state for the second time interval comprises:

determining whether the electronic device is in one moving state among a plurality of moving states according to a sensing signal generated by a sensing unit; and determining whether the electronic device maintains the second moving state for the second time interval when it is determined, according to a variation in the sensing signal, that the electronic device changes to the second moving state from the first moving state, wherein the first moving state is one moving state of the moving states and the second moving state is another moving state of the moving states.

11. The recording medium according to claim 10, wherein the step of determining the electronic device is in one moving state among the plurality of moving states comprises: detecting variation characteristics of the sensing signal over a third time interval to determine whether the user of the electronic device is in one of the moving states, and the second time interval is greater than the third time interval.

12. A portable apparatus with event notification function, wherein the apparatus comprises:

a sensing unit to generate a sensing signal;

a processing unit to detect a notification event and determine whether the notification event is read after no operation is applied to the portable apparatus for a first time interval, wherein if the notification event is not read after no operation is applied to the portable apparatus for the first time interval, then the processing unit determines, according to the sensing signal, whether the portable apparatus changes to a second moving state from a first moving state and maintains the second moving state for a second time interval; if the portable apparatus changes to the second moving state from the first moving state and maintains the second moving state for the second time interval, then the processing unit outputs a notification signal to indicate a occurrence of the notification event.

13. The portable device according to claim 12, wherein the processing unit determines whether the portable apparatus is in one moving state among a plurality of moving states according to the sensing signal;

wherein the processing unit determines, according to variation in the sensing signal, whether the portable apparatus changes to the second moving state of the moving states from the first moving state of the moving states and maintains the second moving state for a second time interval.

14. The portable apparatus according to claim 13, wherein the processing unit detects variation characteristics of the sensing signal over a third time interval to determine whether the portable apparatus is in one of the moving states, and the second time interval is greater than the third time interval.

15. The portable apparatus according to claim 12, wherein the sensing unit generate the sensing signal indicating variation in at least one physical quantity with respect to the portable apparatus.

16. The portable apparatus according to claim 12, wherein the processing unit continues to determine whether the portable apparatus changes to the second moving state from the first moving state and maintains the second moving state for the second time interval if the processing unit determines that the portable apparatus does not receive any operation signal after it is detected that the notification signal is outputted.

17. The portable apparatus according to claim 16, wherein if the processing unit determines that the portable apparatus receives an operation signal, then the portable apparatus, with respect to the notification event, stops determining whether the portable apparatus changes to the second moving state from the first moving state and maintains the second moving state for the second time interval.

18. The portable apparatus according to claim 17, wherein the operation signal denotes a signal of a press key or a signal of a user interface operation, or indicates that the notification event is read.

19. The portable apparatus according to claim 12, wherein the length of the second time interval corresponds to the second moving state.

20. The portable apparatus according to claim 12, wherein the portable apparatus enters a power saving mode after the first time interval.

* * * * *